April 3, 1962 J. C. BEGGS 3,028,096
TEMPERATURE CONTROL VALVE
Filed March 20, 1959 2 Sheets-Sheet 1

INVENTOR
JOHN C. BEGGS
BY Vernon F. Hauschild
ATTORNEY

April 3, 1962 J. C. BEGGS 3,028,096
TEMPERATURE CONTROL VALVE
Filed March 20, 1959 2 Sheets-Sheet 2
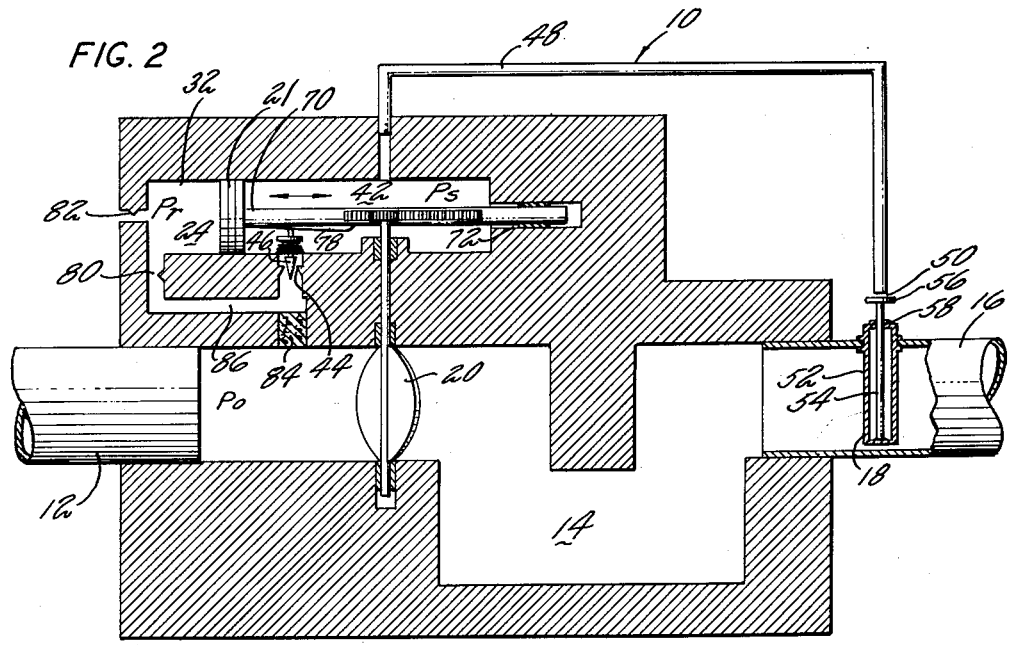
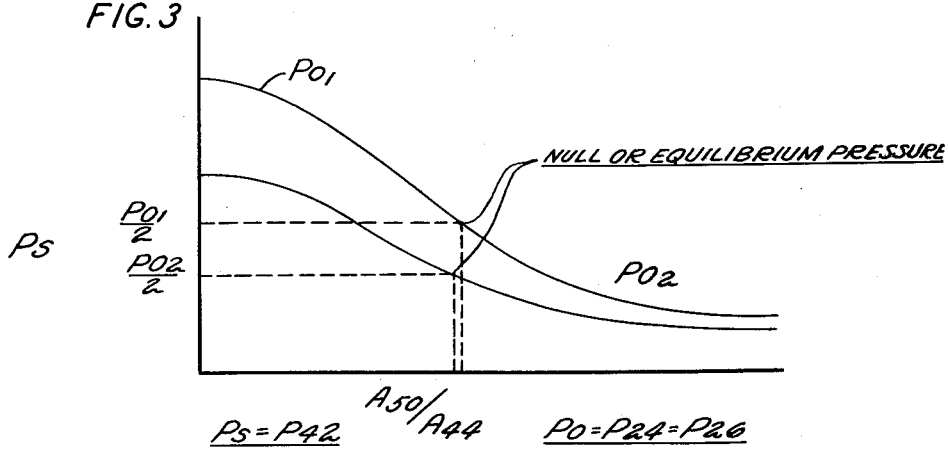
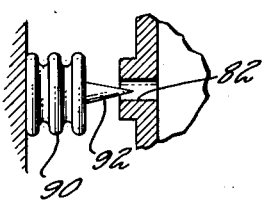
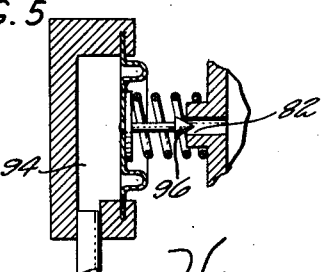
INVENTOR
JOHN C. BEGGS
BY Vernon F. Hauschild
ATTORNEY United States Patent Office 3,028,096
Patented Apr. 3, 1962

3,028,096
TEMPERATURE CONTROL VALVE
John C. Beggs, Manchester, Conn., assignor to United Aircraft Corporation, East Hartford, Conn., a corporation of Delaware
Filed Mar. 20, 1959, Ser. No. 800,721
1 Claim. (Cl. 236—80)

This is a continuation-in-part of U.S. application Serial No. 696,258, now abandoned, and the invention relates to a temperature control valve and an actuating mechanism associated therewith.

It is the general object of the invention to provide an improved valve and valve actuator unit for use in an aircraft air conditioning system for controlling the temperature of air within a compartment supplied with conditioned air, which valve and actuator unit is characterized by simplicity of construction, accuracy of operation and rapid response to temperature change.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

FIG. 1 of the drawings is a schematic illustration of a portion of an aircraft air conditioning system including a single compartment receiving conditioned air from a conduit and a temperature control valve and actuating mechanism provided in accordance with the invention.

FIG. 2 is similar to FIG. 1 but illustrates a second embodiment of my actuating mechanism.

FIG. 3 is a graphic representation of FIGS. 1 and 2 operation.

FIGS. 4 and 5 are enlarged showings of a variable area valve which may be used for biasing purposes with my actuating mechanism.

Figure 1:
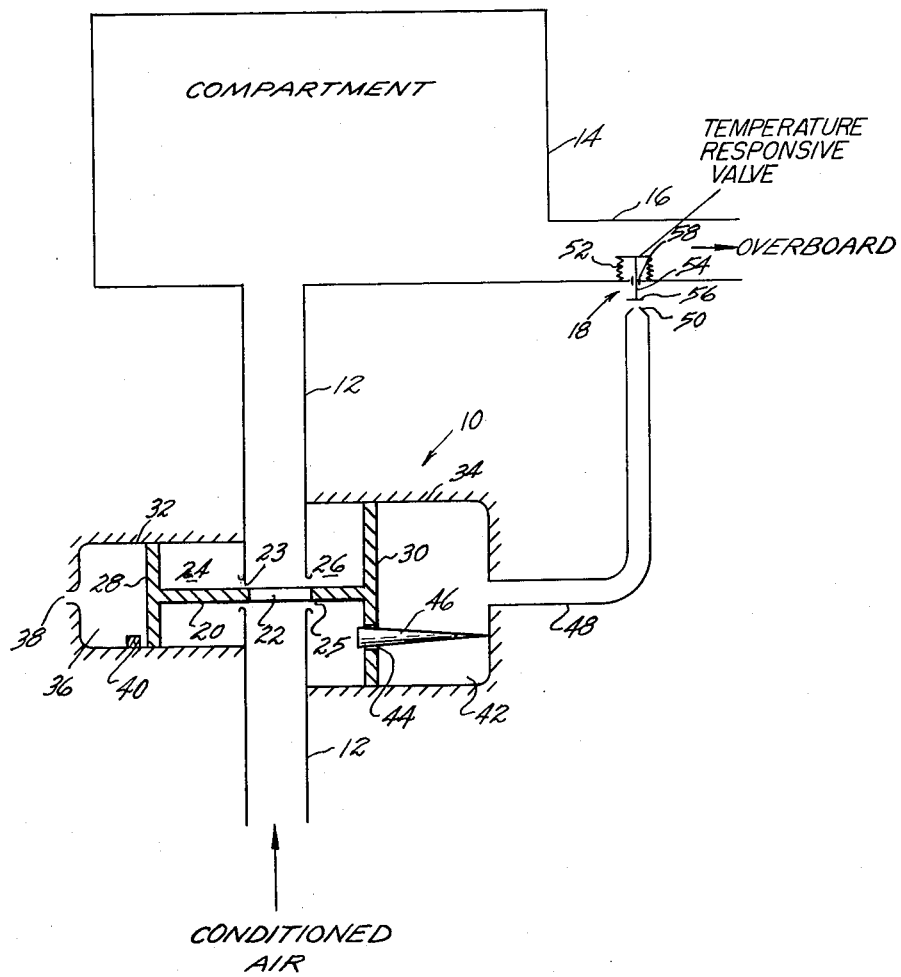

The valve and actuator, indicated generally at 10, are shown associated with a conduit 12 through which air flows from an air conditioner to the compartment 14. From the compartment 14, which may comprise a pod which is located externally of the aircraft proper as well as any of the internally located compartments to which conditioned air is ordinarily supplied, the air flows through an exit conduit 16 past a temperature responsive means 18 and overboard of the aircraft.

The construction of the air conditioner and the manner in which it supplies pressurized conditioned air to the conduit 12 and thence to the compartment 14 form no part of the present invention and for this reason, it has not been shown, any of a number of well-known types of aircraft air conditioners being suited to the purposes of this invention. Further, although the temperature control valve and actuator 10 are equally useful for regulating warming air flow and cooling air flow so as to control temperature, they will be described hereinafter, for purposes of example, as controlling the temperature of air within the compartment 14 by regulating the flow of warming air through the conduit 12.

The valve and actuator unit 10 includes a valve, indicated generally by the reference numeral 20, reciprocably disposed in the conduit 12 and movable in one direction for closing and in an opposite direction for opening. In preferred form, the valve 20 is of the gate type and comprises a member having a generally rectangular plan form adapted to be slidably positioned transversely of the conduit 12. An aperture 22 is provided in the said rectangular member and said aperture preferably conforms substantially with the wall contour of the conduit 12.

The valve actuator preferably includes a first chamber 24 and a second chamber 26, the said chambers 24 and 26 communicating with a common source of pressurized fluid. More specifically, the chambers 24 and 26 may be respectively located adjacent opposite sides of the conduit 12 and the walls of the conduit 12 being in spaced relation with the valve 20 so as to provide a pair of passages 23 and 25 communicating with the chambers 24 and 26 respectively whereby pressurized air from the conduit 12 is supplied to said chambers. A first piston means 28 disposed within a cylinder 32 co-operates therewith to define the first chamber 24 and a second piston means 30 disposed within a cylinder 34 cooperates therewith to define the second chamber 26, the pistons 28 and 30 preferably being integrally connected to the valve 20 at opposite ends thereof and movable therewith. The piston means 30 and chamber 26 are of larger diameter than the piston means 28 and chamber 24, the piston means 30 preferably having an area approximately twice that of the piston means 28.

A third chamber 36 defined by the piston 28 and the cylinder 32 is connectible with a fluid at a reference pressure, as by the port 38 communicating with air at ambient pressure and the piston 30 and the cylinder 34 define a fourth chamber 42 which communicates with said second chamber 26 for supply of pressurized air therefrom preferably by means of an orifice 44 provided in the piston 30.

The first and second chambers 24 and 26 being adjacent opposite sides of the conduit 12, as mentioned above, it will be seen that the first chamber 24 and the third chamber 36 are arranged in inner-to-outer order on one side of the conduit 12 and that the second chamber 26 and the fourth chamber 42 are arranged in inner-to-outer order on the opposite side of the conduit 12, the diameters of the first and third chambers 24 and 36 being equal so as to accommodate reciprocable movement of the piston 20 therewithin and the diameters of the second and fourth chambers 26 and 42 being equal and larger than the diameters of said first and second chambers 24 and 36 so as to accommodate reciprocable movement of the piston 30 therewith. The valve 20 which is integrally connected with the piston 28 and the piston 30, as described, may be arranged to be open when moved transversely of the conduit 12 and toward the smaller first and third chambers 24 and 36 and to be closed when moved toward the larger second and fourth chambers 26 and 42 and a stop, as indicated at 40, may be provided in the third and outer chamber 36 to limit the opening movement of said valve.

In accordance with the present invention, means for controlling the flow of pressurized air from the second chamber 26 to the fourth chamber 42 is provided and may comprise a conical pintle 46 projecting through the above mentioned orifice 44 in the piston 30, said pintle being rigidly secured at its smaller end to the end wall of the chamber 42. Movement of the piston 28, valve 20 and piston 30 toward the open position of the valve 20 will be seen to result in progressively decreasing the area of the orifice 44 and a corresponding decrease in flow through the said orifice 44 from the second chamber 26 to the fourth chamber 42. Conversely, movement of the piston 28, valve 20 and piston 30 toward the closed position of the valve 20 will result in an increased area of the orifice 44 in the piston 30 and an increased flow to the chamber 42.

A discharge conduit 48 communicating with the chamber 42 extends therefrom to a second orifice 50 disposed at the free end of the conduit 48 and adapted to discharge the air in the chamber 42 to a reservoir of air at a reference pressure, said pressure preferably being ambient pressure so as to correspond with the pressure of air in the third chamber 36. Associated with the orifice 50 and operable to vary the area thereof so as to control the discharge flow from the chamber 42 is the temperature responsive means 18. While any temperature responsive means adapted to produce a position proportional to temperature may be used, a liquid filled bellows 52 is illustrated as typical means suitable for the purposes of this invention. The bellows 52 which is preferably secured at one end thereof to a wall of the conduit 16, but which may be disposed in the conduit 12 or in the compartment 14, has affixed to its other end one end of a link 54. The link 54 is provided at its opposite end with an orifice plate 56 which serves to vary the effective area of the orifice 50 at the free end of the discharge conduit 48 in response to the temperature of air surrounding the bellows 52. Expansion of the bellows 52, for example, as from an increase in the temperature of the air surrounding same, moves the link 54 so as to position the orifice plate 56 away from the orifice 50, thereby increasing the effective area of the latter. Seal means, indicated generally at 58, are provided for preventing the escape of liquid from the bellows 52.

It will be apparent from the foregoing that the valve 20 is urged to the right toward the closed position by the air at ambient pressure in the third chamber 36 and by the pressurized air supplied from the conduit 12 in the second chamber 26. Pressurized air supplied from the conduit 12 to the first chamber 24 acts against the piston 28 to urge the valve 20 to the left toward the open position as does the air in the fourth chamber 42 by acting on the piston 30, the pressure of the air in said fourth chamber 42 being determined by the respective areas of the orifices 44 and 50 as controlled respectively by the pintle 46 and the temperature responsive means 18.

Under the aforementioned conditions of valve and actuator operation wherein warming air flows through the conduit 12, the valve and actuator 10 may be operable to impose a limit on the temperature of air within the compartment 14 or to maintain a preselected temperature of air within the compartment 14. Assuming that both the pressure of the ambient air in the chamber 36 and the pressure in the chambers 24 and 26 remain substantially constant, it will be seen that, in order to balance these pressure forces on the valve 20, irrespective of the position of said valve, the pressure of the air within the chamber 42 must always be at one specific level. This level of air pressure is co-operatively controlled by the conical pintle 46, which varies the area of the piston orifice 44 as a result of movement of the piston 30, and by the temperature responsive means 18 which varies the area of the orifice 50 responsive to the temperature of the air in the compartment 14.

If the temperature of the air in the compartment 14 decreases, for example, the bellows 52 contracts thereby decreasing the area of the orifice 50 and increasing the pressure of the air in the conduit 48 and thence the pressure of the air in the chamber 42. The resulting pressure unbalance causes the piston 30, the valve 20 and the piston 28 to be moved to the left toward the open position of the valve 20. As this movement occurs, the area of the orifice 44 is progressively decreased by the conical pintle 46 and the pressure of the air in the discharge conduit 48 and in the chamber 42 is correspondingly decreased. When the air pressure in the chamber 42 has been decreased to the specific level which balances the opposing substantially constant pressure forces, the valve 20 will come to rest at a position of increased opening whereby an increased flow of warming air through the valve aperture 22 and the conduit 12 to the compartment 14 is permitted. For an increase in the temperature of the air in the compartment 14, operation is similar but, of course, in an opposite sense so as to decrease the quantity of warming air flowing to said compartment.

It will be apparent from the above operational description that the response of the valve and actuator unit to temperature change may be expected to be quite rapid, the action of the pintle 46 in changing the pressure of the air in the fourth chamber 42 as a result of movement of the piston 30 involving only a nominal time delay. This feature of operation is particularly desirable where the valve and actuator unit is utilized for controlling temperature, the majority of temperature sensing elements being characterized by relatively slow time constants and the need for a rapidly responding valve and actuator unit therefore being especially acute in these applications.

While in actual practice the pressure of the air in the conduit 12 and the pressure of the ambient air in the chamber 36 may be expected to vary somewhat, such variation will not seriously affect the operation and accuracy of the temperature control valve of this invention. It should be noted, in this regard, that in the majority of air conditioning systems variations in the pressure of the conditioned air normally correspond with variation in ambient pressure, that is, as the aircraft ascends and descends and ambient pressure decreases and increases, the pressure of the conditioned air may be expected to correspondingly decrease and increase. As a result, the air pressures in all of the valve chambers may be expected to vary in a similar manner with respect to each other whereby the effect of such pressure changes on the accuracy of valve and actuator operation is minimized.

It will be apparent to those skilled in the art that with respect to FIG. 1, the results would be unchanged if ambient pressure were introduced into chambers 24 and 26 while the source pressure from conduit 12, which we will call $P_0$, is introduced into chamber 36.

For purposes of further description in connection with FIG. 3, let us consider that the pressure in chamber 42 be designated as servo pressure, $P_S$, and that the pressure from conduit 12, whether in chambers 24 and 26 or in chamber 36, be designated as source pressure $P_0$. Now referring to FIG. 3, we see a graphic representation of the source pressure $P_0$, both as a high pressure and a low pressure, plotted against ratios of the areas of the inlet and outlet orifices 44 and 50 ($A_{50}/A_{44}$) and servo pressure $P_S$. This graph clearly shows that for a given value of $P_0$, our control valve mechanism 10 will null or come into equilibrium at a specific point on the $P_0$ curve and that this null or equilibrium position occurs at a fixed value of servo pressure $P_S$ and a fixed area ratio $A_{50}/A_{44}$ and that this null or equilibrium position occurs when $P_S = \frac{1}{2} P_0$. This null relationship between $P_S$ and $P_0$ is specifically chosen so as to give valve 10 equal force potential in either direction. While we have chosen to illustrate our valve and actuator 10 as a half-area piston in FIG. 1, it may be shown that the same results as are illustrated in the graph of FIG. 3 will be achieved if our construction is made according to FIG. 2, which will be called a half-pressure servo. For purposes of comparison, the same reference numerals used to explain FIG. 1 will be used to designate the corresponding parts in FIG. 2. In the FIG. 2 configuration, source pressure $P_0$ passes along conduit 12, is metered past butterfly-type valve 20 or any other type of valve, passes into compartment 14 and therefrom through conduit 16. Valve actuator 10 comprises piston 21 reciprocating within cylinder 32 to form chambers 24 and 42 on opposite sides thereof. Rod 70 is attached to and projects from piston 21 so that it reciprocates therewith and is supported by bearing 72. Rod 70 carries cam 78. Cam 78 serves the function of positioning valve 20 and plunger 46, so as to vary orifice 44 as a function of and proportional to the movement of piston 21. Fixed orifices 80 and 82 control the flow of source pressure $P_0$ into and out of chamber 24, respectively, to establish reference pressure $P_r$ therein. Fluid at source pressure $P_0$ passes through filter 84, then through line 86 and fixed orifice 80 into chamber 24 to establish reference pressure $P_r$ therein and thence passes to drain or atmosphere through fixed orifice 82. The sizes of orifices 80 and 82 are selected so that reference pressure $P_r$ is one-half of source pressure $P_0$. After passing through filter 84, fluid at source pressure $P_0$ may also pass through variable area orifice 44 into chamber 42 to establish servo pressure $P_S$ therein and then through line 48 and variable area orifice 50 to drain or atmosphere. As previously mentioned, the area of orifice 44 is determined by the position of piston 21 so that changes in the area of orifice 44 are proportional to or a function of the movement of piston 21, and the area of orifice 50 is positioned by a bimetallic pencil type temperature sensor 18 which comprises a high coefficient of expansion material shell 52, which expands with increased temperature and which has a low coefficient of expansion material shaft 54 connected to the base thereof and projecting therefrom in seal fashion at 58 to carry orifice plate 56 in proximity to the mouth of conduit 48 to determine the area of orifice 50. The ratios between the areas of orifices 50 and 44 are so selected that $P_S = \frac{1}{2} P_0$ and, accordingly, piston 21 is in equilibrium when pressure $P_r$ in chamber 24 is equal to pressure $P_S$ in chamber 42.

With respect to the description of the half area servo embodiments shown in FIG. 1, it may be shown that a given null or equilibrium position (FIG. 3) will be experienced by piston 21 so long as source pressure $P_0$ and the area ratio $A_{50}/A_{44}$ remain constant. Variations in $P_0$ require very slight adjustment of area ratio. With respect to the description of the half pressure servo embodiments shown in FIG. 2, it may be shown that a given null or equilibrium position (FIG. 3) will be experienced as long as the area ratio $A_{50}/A_{44}$ is constant. If $A_{50}/A_{44}$ is constant and equal to $A_{82}/A_{80}$, then servo pressure $P_S$ will always equal reference pressure $P_r$ regardless of source pressure $P_0$.

As mentioned previously in connection with FIG. 1, actuator 10 was chosen to be of the half area type so that the valve is in equilibrium when $P_S = \frac{1}{2} P_0$, thereby effecting equal force potential for valve 20 in either direction. The same is true in connection with the half pressure servo shown in FIG. 2, in which piston 21 is purposely placed in equilibrium when reference pressure $P_r$ and servo pressure $P_S$ are equal to one-half source pressure $P_0$ to effect equal force potential for piston 21 in either direction. It is conceivable that under certain circumstances it may be deemed desirable to bias the area ratio $A_{82}/A_{80}$ in accordance with a particular parameter so that a modification of the area ratio $A_{50}/A_{44}$ (i.e., a change in the set point temperature to alter $A_{50}$) is required to effect a force balance on the piston 21. If $A_{82}$ is increased by a certain percenatge, $A_{50}$ will require an equal percentage change.

For purposes of illustration, FIGS. 4 and 5 illustrate two such biasing apparatus, the former being an altitude bias in which evacuated bellows 90 is subjected externally to atmospheric pressure and carries plunger 92 and hence varies the area of orifice 82 to effect an altitude bias. FIG. 5 shows a pressure bias in which the biasing pressure, possibly a function of ambient temperature, velocity, rotational speed, rate of flow, time from the initiation of a disturbance, or any other desired parameter, is introduced into chamber 94 which carries plunger 96 to vary the area of orifice 82 and hence bias reference pressure $P_r$ as a function of the desired parameter.

It is to be understood that the invention is not limited to the specific embodiment herein illustrated and described but may be used in other ways without departure from its spirit as defined by the following claim.

I claim:

In an aircraft air conditioning system which includes a conduit for carrying conditioned air to a compartment, the combination comprising a gate valve disposed in the said conduit and slidably adjustable between open and closed positions, a fluid pressure responsive actuator connected with the valve having first and second pistons rigidly connected to said valve at opposite ends thereof and movable with said valve, said second piston having approximately twice the area of said first piston and including an orifice, a first chamber which communicates with the conduit for pressurized air supply to act on said first piston whereby to urge the valve toward the open position, a second chamber which communicates with the conduit for pressurized air supply to act on said second piston whereby to urge the valve toward the closed position, a third chamber having air at ambient pressure to act on said first piston whereby to urge the valve toward the closed position, a fourth chamber which is supplied with pressurized air from said second chamber through said second piston orifice to act on said second piston whereby to urge the valve toward the open position, a conical pintle projecting through said second piston orifice and serving to decrease the area of said orifice upon movement of said second piston in the valve opening direction and to increase the area of said orifice upon movement of said second piston in the valve closing direction, a discharge conduit for said fourth actuator chamber having an orifice at its free end, and means responsive to the temperature of air in said compartment for decreasing the area of said discharge conduit orifice in response to temperature change in one direction and for increasing the area of said orifice in response to temperature change in the opposite direction, the position of said second piston and the area of said second piston orifice being changed upon change in the area of said discharge conduit orifice whereby to control the pressure of air in said fourth actuator chamber and the position of said valve and the temperature of air in said compartment.

References Cited in the file of this patent

UNITED STATES PATENTS

| | | |
|---|---|---|
| 1,046,236 | Wagner | Dec. 3, 1912 |
| 2,127,162 | Beauregard | Aug. 16, 1938 |
| 2,200,318 | Yongers | May 14, 1940 |
| 2,752,891 | Farkas | July 3, 1956 |
| 2,775,231 | Silver | Dec. 25, 1956 |
| 2,780,413 | Jensen | Feb. 5, 1957 |
| 2,821,343 | Payne | Jan. 28, 1958 |
| 2,870,964 | Lindbom | Jan. 27, 1959 |

FOREIGN PATENTS

| | | |
|---|---|---|
| 278,689 | Germany | Oct. 2, 1914 |
| 135,628 | Australia | Dec. 6, 1949 |
| 128,554 | Sweden | June 20, 1950 |